(12) United States Patent
Braun et al.

(10) Patent No.: US 11,145,880 B2
(45) Date of Patent: Oct. 12, 2021

(54) HIGH EFFICIENCY SOLID OXIDE FUEL CELL—INTERNAL COMBUSTION ENGINE HYBRID POWER SYSTEM

(71) Applicants: Robert Braun, Arvada, CO (US); Todd Bandhauer, Fort Collins, CO (US); Daniel Olsen, Fort Collins, CO (US); Bret Windom, Fort Collins, CO (US)

(72) Inventors: Robert Braun, Arvada, CO (US); Todd Bandhauer, Fort Collins, CO (US); Daniel Olsen, Fort Collins, CO (US); Bret Windom, Fort Collins, CO (US)

(73) Assignees: Colorado School of Mines, Golden, CO (US); Colorado State University Research Foundaton, Fort Collins, CO (US)

( * ) Notice: Subject to any disclaimer, the term of this patent is extended or adjusted under 35 U.S.C. 154(b) by 170 days.

(21) Appl. No.: 16/232,714

(22) Filed: Dec. 26, 2018

(65) Prior Publication Data

US 2020/0028190 A1    Jan. 23, 2020

Related U.S. Application Data

(60) Provisional application No. 62/609,812, filed on Dec. 22, 2017.

(51) Int. Cl.
*H01M 8/04111* (2016.01)
*H01M 8/04701* (2016.01)
(Continued)

(52) U.S. Cl.
CPC .... *H01M 8/04111* (2013.01); *H01M 8/04007* (2013.01); *H01M 8/04708* (2013.01);
(Continued)

(58) Field of Classification Search
CPC .. H01M 8/10; H01M 8/1007; H01M 8/04007; H01M 8/04708; H01M 8/04111; H01M 2008/1293
See application file for complete search history.

(56) References Cited

U.S. PATENT DOCUMENTS 7,201,979 B2   4/2007  McElroy et al.
7,807,313 B2  10/2010  Kaye et al.
(Continued)

FOREIGN PATENT DOCUMENTS

WO    WO-2014177336 A1 * 11/2014 ............. C25B 15/02

OTHER PUBLICATIONS

"Gas-turbine engine", Britannica. https://www.britannica.com/technology/gas-turbine-engine. Accessed Sep. 2, 2020. (Year: 2020).*
(Continued)

*Primary Examiner* — Jonathan G Jelsma
(74) *Attorney, Agent, or Firm* — Sheridan Ross P.C.

(57) ABSTRACT

A hybrid stationary power generator is provided. The system is fueled from natural gas and based on SOFCs and high efficiency, internal combustion (IC) engine technologies is conceived to generate electric power at 100-kW scale with an efficiency of 71% and a capital cost of <900 $/kW. This novel system integrates a solid oxide fuel cell (SOFC) stack with a high efficiency stationary engine and balance-of-plant (BOP) equipment to create a hybrid power system.

20 Claims, 1 Drawing Sheet

(51) Int. Cl.
*H01M 8/04007* (2016.01)
*H01M 8/1007* (2016.01)
*H01M 8/0662* (2016.01)
*H01M 8/124* (2016.01)

(52) U.S. Cl.
CPC ....... *H01M 8/0662* (2013.01); *H01M 8/1007* (2016.02); *H01M 2008/1293* (2013.01)

(56) References Cited

U.S. PATENT DOCUMENTS

| | | | |
|---|---|---|---|
| 8,637,197 | B2 | 1/2014 | Braun et al. |
| 9,631,284 | B2 | 4/2017 | Braun et al. |
| 9,947,953 | B2 | 4/2018 | Braun et al. |
| 2004/0197239 | A1 | 10/2004 | Mirkovic et al. |
| 2005/0048334 | A1 | 3/2005 | Sridhar et al. |
| 2005/0233188 | A1 | 10/2005 | Kurashima et al. |
| 2007/0099057 | A1* | 5/2007 | Ferrall ............... H01M 8/04111 429/434 |
| 2008/0107932 | A1 | 5/2008 | Pham |
| 2011/0071331 | A1 | 3/2011 | Basset et al. |
| 2012/0241678 | A1 | 9/2012 | Valentin et al. |
| 2014/0194539 | A1 | 7/2014 | Hammad et al. |
| 2015/0303499 | A1* | 10/2015 | Saito ................... H01M 8/0662 429/415 |
| 2017/0005357 | A1* | 1/2017 | Mermelstein ..... H01M 8/04671 |

OTHER PUBLICATIONS

"Versa Power, Boeing in DARPA contract for ultra-long-flight aircraft," Fuel Cells Bulletin, Jan. 2011, vol. 2011, issue No. 1, pp. 4-5.
Wikipedia, "Sabatier reaction," Mar. 4, 2012, available at www.en.wikipedia.org/wiki/Sabatier_reaction, 3 pages.
Wikipedia, "Solid oxide fuel cell," Mar. 20, 2012, available at www.en.wikipedia.org/w/index.php?title=Solid oxide fuel cell&oldid=482944085, 11 pages.
Wikipedia, "Water gas shift reaction," Jan. 23, 2012, available at www.en.wikipedia.org/w/indiex.php?title=Water gas shift reaction & oldid=472764046, 3 pages.
Becker et al., "Production of Fischer-Tropsch liquid fuels from high temperature solid oxide co-electrolysis units," Energy, 2012, vol. 47, Iss. 1, pp. 99-115.
Bents, "High Temperature Solid Oxide Regenerative Fuel Cell for Solar Photovoltaic Energy Storage," 22nd Intersociety Energy Conversion Engineering Conference, Aug. 10-14, 1987, NASA Technical Memorandum 89872, 18 pages.
Bierschenk et al., "High efficiency electrical energy storage using a methane-oxygen solid oxide cell," Energy Environ. Sci., Dec. 20, 2010, available at www.pubs.rsc.org/doi:10.1039/C0EE00457, 8 pages.
McElroy et al., "Optimization & Demonstration of a Solid Oxide Regenerative Fuel Cell System," Technical Progress Report—Year 1, U.S. Dept. of Energy National Energy Technology Lab., Dec. 2004, 35 pages.
Petri, "Advanced Materials for RSOFC Dual Operation with Low Degradation," Versa Power Systems, DOE Hydrogen Program Review, Jun. 11, 2010, 21 pages.
Wendel et al., "Modeling and Design of a Novel Solid Oxide Flow Battery System for Grid-Energy Storage," 10th European SOFC Forum, Jun. 26-29, 2012, pp. 80-90.
Xu et al., "A novel solid oxide redox flow battery for grid energy storage," Energy Environ. Sci., 2011, vol. 4, pp. 4942-4846.
Official Action for U.S. Appl. No. 13/432,219, dated Oct, 26, 2012, 8 pages.
Official Action for U.S. Appl. No. 13/432,219, dated May 23, 2013, 8 pages.
Notice of Allowance for U.S. Appl. No. 13/432,219, dated Sep. 18, 2013, 11 pages.
Official Action for U.S. Appl. No. 13/554,468, dated Nov. 18, 2016, 6 pages. Restriction Requirement.
Official Action for U.S. Appl. No. 13/554,468, dated May 15, 2017, 10 pages.
Official Action for U.S. Appl. No. 14/213,879, dated Jan. 29, 2016, 5 pages Restriction Requirement.
Official Action for U.S. Appl. No. 14/213,879, dated Jun, 16, 2016, 10 pages.
Notice of Allowance for U.S. Appl. No. 14/213,879, dated Dec. 19, 2016, 8 pages.

* cited by examiner

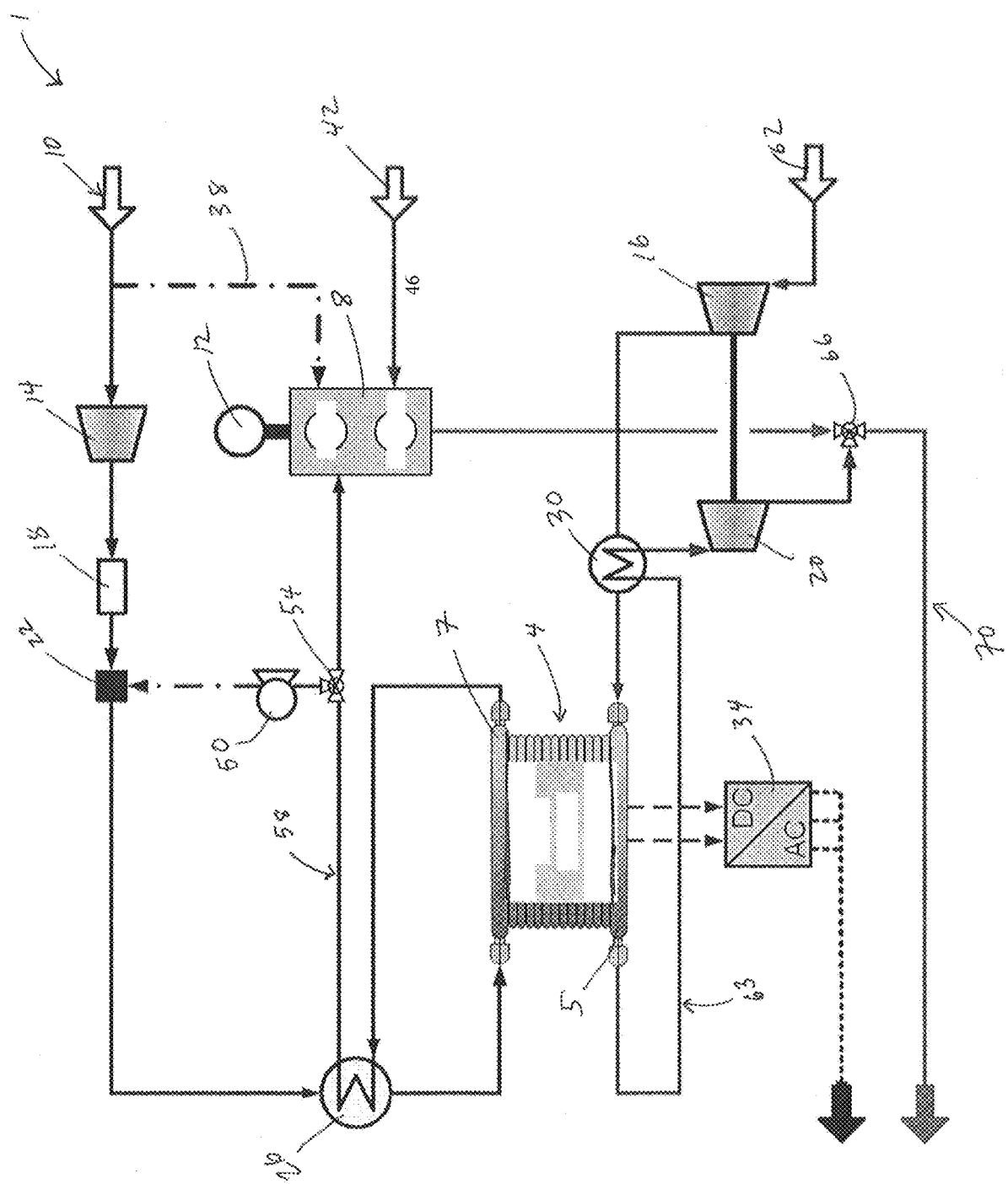

HIGH EFFICIENCY SOLID OXIDE FUEL CELL—INTERNAL COMBUSTION ENGINE HYBRID POWER SYSTEM

CROSS-REFERENCE TO RELATED APPLICATIONS

This application claims priority and the benefit 35 U.S.C. § 119(e) to U.S. Provisional Patent Application Ser. No. 62/609,812, filed Dec. 22, 2017, the entire disclosures of which are incorporated by reference herein.

FIELD OF THE INVENTION

The present invention generally relates to power generation systems. More specifically, embodiments of the present invention relate to a hybrid power system including high efficiency solid oxide fuel cells (SOFCs) and an internal combustion (IC) engine, and a method of using the system.

BACKGROUND

SOFCs are a scalable and efficient form of energy production, which minimize greenhouse gas emissions. SOFCs use a solid oxide electrolyte to oxidize gases by electrochemically conducting oxygen ions from a cathode to an anode. Generally, hydrogen, carbon monoxide, or a hydrocarbon molecule are oxidized on the anode side.

SOFCs do not require expensive catalyst materials. However, one drawback of SOFCs is that they require high temperatures to operate efficiently, sometimes at temperatures of 750° C. to 1000° C. High capital cost and poor durability have been significant barriers for solid oxide fuel cell technology to achieve widespread adoption in commercial distributed power generation applications. In part, these challenges have historically been associated with their high operating temperatures (750-1000° C.). While progress in cost reduction and durability has been made, even at high production volumes, relatively high balance-of-plant costs (~760 $/kW), and low lifetime average system efficiency (45-55%) still limit their value proposition and market potential. Additionally, high temperature SOFC technology has long suffered from low robustness/durability, poor dynamic response, and high stack and balance-of-plant (BOP) costs.

SUMMARY

To address these shortcomings of SOFCs, the present invention creates a hybrid system including a high efficiency SOFC and an internal combustion engine to reduce fuel consumption and increase the efficiency of the system. The present invention synergistically addresses these issues in a number of ways. First, while various SOFC technologies might be employed, a low-temperature metal-supported SOFC (MS-SOFC) technology is inherently robust. In addition, the operating temperature of an MS-SOFC reduces requirements for high cost materials throughout the system, reduces heat exchanger duties, and improves dynamic response. Other suitable SOFCs can include an anode supported SOFC, or electrolyte supported SOFC.

Power density improvements will help reduce capital costs of the SOFC stack. These improvements may come from a number of areas, including advancements by SOFC developers and pressurization of the system. Pressurization enhances both power density and cell efficiency. This combination allows higher voltages at higher design current density. When coupled with a high degree of internal reforming (greater than about 75%), higher current operation can be managed with lower system airflows from improved SOFC stack thermal management, thereby lowering both stack and BOP heat exchanger costs. Thus, the power density improvements and pressurized operation of SOFC technology, will enable equivalent or lower projected costs over traditional ambient pressure SOFC technology. Using a modified IC engine in a hybrid system provides a low cost, robust, controllable, and easily integrated solution to convert the remaining chemical energy in the anode off-gas into work. Moreover, additional BOP cost reduction can be accomplished with innovative rotating equipment.

According to embodiments of the present invention, a system that includes a fuel compressor, SOFC air compressor, SOFC expander, and recycle blower can all be directly coupled to an engine, which is an IC engine, via the engine crankshaft. This configuration improves efficiency over other SOFC power generation systems. Furthermore, this configuration can lower costs by eliminating the need for electric motors to drive or harness power to and from these devices within the system. Those skilled in the art will appreciate that the compressors and expanders can spin at nominally the same speed as the engine itself, or possibly a similar speed, which can eliminate high gear ratio gearboxes, and enable direct drive of these auxiliary components through the use belts to transfer power from the engine crankshaft to the compressors/blowers. Directly-driven auxiliary rotating equipment, such as blowers and compressors discussed herein, can be driven by the engine, and therefore use either DC or AC power from the system to drive an electric motor to power this equipment.

Those skilled in the art will appreciate that an important aspect of the present invention is scalable power capacity. Although the disclosure focuses on about 125 kW HPS, it will be understood that the fuel cell/engine combinations can be scaled up to 10 MW of power. Generally, the power split between the SOFC/IC engine can be between 80/20% or 90/10%, i.e. the SOFC delivers 80-90% of the rated power output of the system. This can be accomplished with a single SOFC stack that feeds a single engine or with multiple SOFC stacks operating in parallel, feeding an engine, or with a single and/or multiple SOFCs feeding single and/or multiple engines. It will be understood that the present invention includes any such combination of single/multiple SOFC/IC engine power blocks.

Another aspect of the present invention includes internal reforming of the fuel feedstock within the SOFC to make hydrogen. This aspect is highly relevant for the thermal management aspects of the present invention related to the selection of operating conditions in the system, including the SOFC stack. Internally reforming a portion of the fuel within the SOFC stack lowers the cooling air requirements to the SOFC, which in turn lowers the blower's parasitic load. This process increases system efficiency and lowers the air preheater/heat exchanger's duty requirement, thereby lowering costs, and further enabling the use of a lower temperature recycle blower. The lower recycle blower inlet gas temperatures can be accomplished by recuperating thermal energy from the anode exhaust gas to preheat the fuel and to partially reform a fraction of it (generally between about 5-50% of the fuel/steam entering the preheater/heat exchanger can be "pre-reformed"). In addition to increasing efficiency, the use of a lower temperature recycle blower also improves controllability of the system as compared with using an ejector to accomplish the fuel recycle and mixing at the valve. Fuel reforming processes require steam (which can be obtained from the anode exhaust gas). This steam can be mixed with fuel in a proportion measured by the steam-to-carbon ratio, and that proportion typically ranges from about 1.5:1 to about 3.0:1.0.

With regard to the thermal management aspect, it should be noted that the fuel reforming reactions are high temperature endothermic processes and can be accomplished either external to the fuel cell, internal to the fuel cell, or with some combination of internal and external to the fuel cell. According to some embodiments of the present invention, about 15% of the $CH_4$ (molar) and higher hydrocarbons, such as ethane, propane, or butane, in the fuel can be converted to $H_2/CO$ within the integral fuel preheater/heat exchanger/reactor device (external to the SOFC). The remaining about 85% of the fuel can be reformed within (internal to the SOFC stack).

According to various embodiments of the present invention, the compressor and blower hardware types can be positive displacement type devices (like scroll type machinery), which can simplify the integration and control of rotating equipment with the SOFC. Furthermore, positive displacement type devices can eliminate issues of compressor surge, which are commonly encountered when integrating centrifugal machines (compressors/expanders) with fuel cells. Other types of non-positive displacement devices can be used, and may be advantageous as the scale of the system exceeds the capacity of positive displacement devices. Other types of non-positive displacement devices can include centrifugal, axial, and mixed flow.

An aspect of the present invention can include a hybrid power generator system that includes a solid oxide fuel cell having an anode, an electrolyte layer, an interconnect layer, and a cathode. A fuel line connected to an anode of said fuel cell, wherein said fuel line carries a fuel to said anode. The fuel reacts at the anode and produces a modified fuel with a composition that is different than said fuel. An oxidizer line connected to a cathode of the fuel cell carries a pressurized first oxidizer to the cathode. The pressurized first oxidizer reacts at the cathode and produces a modified first oxidizer with a oxidation composition that is different than the pressurized first oxidizer. The fuel cell generates electric power from the reactions at the anode and cathode. An internal combustion engine, which is downstream from the fuel cell has an intake that receives an anode exit stream. The internal combustion engine includes a driveshaft that powers at least one component of the system including a compressor, for example by direct mounting of rotating hardware or the use of belt-pulley arrangements, or similar methods. The compressor intakes a first oxidizer and exhausts the pressurized first oxidizer at a higher pressure.

An aspect of the invention is a method of generating power. The method includes providing at least one fuel cell having an electrolyte layer positioned between an anode and a cathode and an interconnect layer. The fuel is reacted at the anode to produce a modified fuel with a composition that is different than said fuel. A pressurized first oxidizer is reacted at the cathode to produce a modified first oxidizer with a composition that is different than the pressurized first oxidizer. Power is generated by said fuel cell based on the reactions at the anode and cathode and based on a resulting ion migration through the electrolyte layer and interconnect layer. An internal combustion engine having an intake downstream from the fuel cell generates mechanical power by combusting the modified fuel and a second oxidizer. A compressor pressurizes a first oxidizer to a pressurized first oxidizer and the compressor is powered by the internal combustion engine.

An aspect of the present invention is a hybrid power generator system. The system includes a fuel cell having an anode, an electrolyte layer, an interconnect layer, and a cathode. A fuel line is connected to the anode of the fuel cell. The fuel line carries a fuel to the anode where it reacts to produce a modified fuel with a composition that is different than said fuel. An oxidizer line is connected to the cathode of the fuel cell. The oxidizer line carries a pressurized first oxidizer to the cathode. The pressurized first oxidizer at the cathode reacts and produces a modified first oxidizer with a composition that is different than the pressurized first oxidizer, and the fuel cell generates electric power from the reactions at the anode and cathode and from a resulting ion migration through the electrolyte layer. An internal combustion engine having an intake is connected by an intermediate line to the fuel cell. The intermediate line carries the modified fuel to the intake, and the internal combustion engine combusts a combination of the modified fuel and a second oxidizer to generate mechanical power. A compressor powered by the internal combustion engine intakes a first oxidizer and exhausts the pressurized first oxidizer at a higher pressure. A fuel heat exchanger connected to the fuel line and the intermediate line transfers heat to the fuel in the fuel line, which enters the fuel heat exchanger at a first temperature and exits the fuel heat exchanger at a higher second temperature. An exit line connected to the cathode carries the modified first oxidizer away from the fuel cell. An oxidizer heat exchanger which connects the oxidizer line to the exit line transfers heat to the pressurized first oxidizer in the oxidizer line. The pressurized first oxidizer enters the oxidizer heat exchanger at a first temperature and exits the oxidizer heat exchanger at a higher second temperature. A combining element, which includes a blower and a mixing valve or an expander is connected to the exit line. The modified first oxidizer enters the combining element at a first pressure and exits the combining element at a lower second pressure to generate a pressure differential. The combining element produces mechanical energy from the pressure differential of the modified first oxidizer. The compressor is at least partially powered by the engine.

BRIEF DESCRIPTION OF THE DRAWINGS

The accompanying drawing, which are incorporated in and constitute a part of the specification, illustrate embodiments of the disclosed system and together with the general description of the disclosure given above and the detailed description of the drawing given below, serve to explain the principles of the disclosed system(s) and device(s).

FIG. 1 illustrates a process flowsheet for a hybrid power system.

DETAILED DESCRIPTION

Reference List

| Drawing Number | Component Name |
| --- | --- |
| 1 | HPS |
| 4 | SOFC |
| 5 | Cathode |
| 7 | Anode |
| 8 | Internal Combustion Engine |
| 10 | Fuel |
| 12 | Generator/Alternator |
| 14 | Fuel Compressor |

-continued

| Drawing Number | Component Name |
| --- | --- |
| 16 | Air Compressor |
| 18 | Desulfurizer |
| 20 | Expander |
| 22 | Mixing Valve/Ejector |
| 26 | Heat Exchanger |
| 30 | Heat Exchanger |
| 34 | Inverter |
| 38 | Supplemental Fuel Line |
| 42 | Engine Air |
| 46 | Air Line |
| 50 | Recycle Blower |
| 54 | Valve |
| 58 | Anode Exhaust Gas |
| 62 | Oxidizing Gas |
| 63 | Cathode Exit Stream |
| 66 | Mixing Valve |
| 70 | Exhaust Gas Line |

The present invention relates to a hybrid stationary power generator fueled from natural gas and based on SOFCs, and IC engine technologies. The system generates electric power at a scale of between about 100 kW to about 10,000 kW, in some embodiments about 100-kW scale, with an efficiency of the system being between about 60% and about 75%, in some embodiments about 71%, and a capital cost of less than about 900 $/kW. This novel system integrates a SOFC stack with a high efficiency stationary engine and BOP equipment to create a hybrid power system (HPS). While ranges and specific values for the operating parameters of the system are discussed within this Specification, one skilled in the art would be able to scale the system for use with a specific configuration without deviating from this invention.

This HPS technology can enhance the economic return of the system, improve the energy security of the United States, reduce energy-related emissions, and improve the energy efficiency of electricity generation. In function, the IC engine can use the exhaust and/or syngas from the anode side of the SOFC as fuel to directly drive a compressor. The compressor can then supply pressurized air to the fuel cell. An electric generator can also be driven by the IC engine to utilize excess mechanical shaft power.

The HPS can export AC power to the electric grid using DC-to-AC inverter technology. The availability of such a system can accelerate the deployment of distributed electricity generation, which can help support the existing electric grid, and eliminate losses due to transmission and distribution, while also displacing less efficient electricity generation at fossil-fueled generation systems.

One embodiment of the HPS and a method to use the HPS is illustrated in FIG. 1. The HPS 1 includes a SOFC 4, an IC engine 8, which can burn gas, at least one fuel compressor 14, at least one air compressor 16, at least one expander 20, at least one heat exchanger 26, 30, a recycle blower 50, and, when required, an inverter 34. The IC engine 8 can be at least one of a naturally aspirated engine, a turbocharged engine, a super charged engine and the method of fuel-air charge ignition can be at least one of spark ignition, compression ignition (i.e., diesel) or homogenous charged compression ignition (HCCI). Any of a number of valve timing options can be used, for example a Miller cycle or Atkinson cycle. In some embodiments, a desulfurizer 18 can be included in the HPS 1 to remove contaminants from the fuel source. Furthermore, additional equipment parts or multiple units of the same equipment part (e.g. more than one IC engine 8 or SOFC 4) can be included in the HPS 1, without deviating from the invention.

The SOFC 4 can be a pressurized SOFC. Suitable examples, include, but are not limited to, an anode supported SOFC, electrolyte supported SOFC, or a MS-SOFC, or combinations thereof. MS-SOFCs include a metal support layer. This metal can be any grade of stainless steel or Ni/Mo steel-alloys, and combinations of these metals. The SOFC stack 4 will include a cathode 5, an electrolyte, an interconnect, an anode 7, which one skilled in the art would understand to include repeating cell units of these components and balance-of-stack hardware. A material of the cathode 5 can include porous, composite layers of lanthanum perovskites, strontium-doped lanthanum cobalt ferrite, strontium-doped lanthanum manganite, gadolinium doped ceria, and combinations thereof. A material of the anode 7 and anode-support can include porous, composite layers of nickel-ceria cermets, nickel-yttria-stabilized zirconia cermets, nickel infiltrated lanthanum strontium-doped gadolinium manganite, nickel infiltrated strontium-doped lanthanum titanate (SLT), and combinations thereof, including nickel nano-particle infiltrated versions of the electrode. Suitable electrolytes can include yttria-stabilized zirconia (YSZ), strontium- and magnesium-doped lanthanum gallate (LSGM), or gadolinium-doped ceria composite electrolyte (CGO). One skilled in the art would understand that the SOFC 4 can be different geometries without deviating from the invention.

Fuel 10 is provided to the anode 7 of the SOFC 4. The fuel 10 can be a combustible gas, for example include methane, ethane, propane, butane, gas mixtures containing at least one hydrocarbon such as methane, ethane, propane, or butane, natural gas mixtures containing these hydrocarbons, and the like a syngas (wherein the syngas comprises between about 5-100 vol. % of hydrogen, about 5-100 vol. % of carbon monoxide), biogas, or combinations thereof.

The HPS 1 can include at least one fuel compressor 14. In some embodiments, there can be a fuel compressor 14 on the anode side of the HPS 1. The fuel 10 provided to the fuel compressor 14 can be at a temperature of between about 0° C. and about 50° C., and a pressure of between about 0 psig and about 15 psig. In some embodiments, the fuel 10 can enter the fuel compressor 14 at about 15° C. The rate of the fuel 10 provided to the fuel compressor 14 can vary between about 2 grams per second (g/s) to about 400 g/s depending on the overall power and efficiency of the HPS. In some embodiments, the fuel 10 can enter the fuel compressor 14 at about 2.60 g/s. The fuel 10 can exit the fuel compressor 14 at a temperature between about 40° C. and about 150° C. and a pressure of between about 40 psi and about 75 psi. In some embodiments, the fuel 10 can exit the fuel compressor 14 at about 47° C. and a pressure of about 45 psi. The fuel 10 can exit the fuel compressor 14 at a rate of between about 2 g/s and about 400 g/s. In some embodiments, the fuel 10 can exit the fuel compressor 14 at a rate of about 2.60 g/s. The fuel compressor 14 consumes power to operate. The compressor can be powered by other system parts, for example an expander or the crankshaft of the IC engine. The fuel compressor 14 can require between about 50 W per g/s of fuel flow and about 300 W per g/s of fuel flow. In some embodiments, the fuel compressor 14 can require about 200 W per 2.6 g/s to operate.

In various embodiments of the HPS 1 can include at least one recycle blower 50 and one mixing valve 22 downstream of the fuel compressor 14. The recycle blower 50 can create a recycle flow of exhaust gas 58 from the anode 7 to mix with the fresh fuel 10 toward the fuel heat exchanger 26. The recycle stream provides the necessary $H_2O$ for steam-methane reforming to take place downstream in the fuel heat exchanger 26 and within the SOFC 4 itself. The recycled anode exhaust gases also heats the fuel 10 to a higher temperature (between about 1000% and about 2000% increase in the temperature at exiting compared to the fuel temperature entering). The fuel 10 enters the mixing valve 22 at about 40° C. to about 150° C. In some embodiments, the fuel 10 can enter the ejector at about 47° C. The fuel 10 leaves the mixing valve 22 at about 200° C. to about 300° C. In some embodiments, the fuel 10 can exit the valve 22 at about 233° C. In some embodiments, a desulfurizer 18 can be located between the fuel compressor 14 and the mixing valve 22. In other embodiments, the mixing valve 22 and recycle blower 50 could be replaced with a gas ejector. The ejector can use the high pressure from the discharge of the fuel compressor 14 to induce a vacuum to pull a portion of the anode exhaust gases 58 that exit the heat exchanger 26 to mix with the fresh fuel supply from 10.

According to embodiments of the present invention, the fuel 10 travels from the mixing valve 22 to a heat exchanger 26, which can be a fuel preheater. The fuel 10 enters the heat exchanger 26 at about 230° C. to about 300° C. In some embodiments, the fuel 10 can enter the heat exchanger 26 at about 235° C. The fuel 10 leaves the heat exchanger 26 at about 500° C. to about 750° C. In some embodiments, the fuel 10 can exit the heat exchanger 26 at about 550° C.

According to various embodiments of the present invention, the HPS 1 includes at least one blower 50, which can be used to recycle a fluid to the mixing element 22 from a valve 54. The valve 54, when used, can control the flow of recycled fuel to the IC engine 8 or to the blower 50, which can be combined with fuel 10, or to both the IC engine 8 and the blower 50. The recycled fuel can contain unburned fuel components which can be used in the IC engine or recycled to the SOFC. The recycled fuel can be directed to the blower 50 from the valve 54 and can enter the blower 50 at about 18 g/s to about 1800 g/s, about 250° C. to about 550° C., and about 2 bar to about 5 bar. In some embodiments, the recycled fuel can enter the blower 50 at about 310° C., about 3.0 bar, and about 24 g/s. The mixing element can include the at least one combination of a recycled blower and a mixing valve or an ejector, where the ejector acts as both a recycle blower and a mixing valve. The mixing element can be connected to the recycle line enabling mixing of fuel 10 and steam contained in the anode exhaust line 58. In the case of an ejector serving as a mixing element, the ejectors pumps the recycled anode exhaust fluid of lower static pressure to higher static pressure via turbulent entrainment and mixing with the pressurized fuel supply 10 (i.e., a higher-energy primary fluid). The momentum exchange between the primary and recycled gas streams produces a discharge of mixed fluid flow at an intermediate pressure and with higher mass flow. Anode exhaust gas 58 can be directed to the IC engine 8 or the blower 50 through an anode recycle line 58. The recycled fuel which can be directed to the IC engine 8 can combust to create energy.

In various embodiments of the present invention, at least some of the fuel 10 can be directed through valve 54 to the IC engine 8. The capacity of the IC engine 8 can be about a 1 L to about a 20 L engine having a compression ratio of about 10 to about 24. In some embodiments, the capacity of the IC engine 8 can be about 2.0 L, having a compression ratio of about 17. The IC engine 8 can operate between about 1800 rpm to about 3600 rpm. In some embodiments, the IC engine 8 can operate at about 2000 rpm. The IC engine 8 can be configured for turbocharging boosting the engine air supply pressure by about 7 psi to about 28 psi. In some embodiments, the IC engine 8 can operate with turbocharging with about 12 psi boost pressure. The IC engine 8 can be configured to use exhaust from the anode side of the HPS 1 to drive a compressor, which can be the fuel compressor 14 on the anode side of the HPS 1 and an air compressor 16 on the cathode side of the HPS 1. Fuel 10 can travel from the anode exhaust 58 and can enter the IC engine 8 at about 40° C. to about 325° C. and about 10 g/s to about 1500 g/s. In some embodiments, the fuel 10 can enter the IC engine 8 at about 267° C. and about 15 g/s. The products of combusted fuel can leave the IC engine 8 at about 250° C. to about 600° C. and about 1.5 bar to about 3.0 bar. In some embodiments, the fuel 10 can exit the IC engine 8 at about 281° C. and about 2.369 bar. In some turbocharged engine embodiments, the combusted fuel products can be expanded through the turbocharger expander before entering the mixing valve 66.

Fuel 10 can enter the IC engine 8 through a supplemental fuel line 38. The fuel 10 from the supplemental fuel line 38 can provide from about 0% to about 100% of the total amount of fuel provided to the IC engine 8. In some embodiments, during start-up of the HPS, the amount of fuel 10 provided from the supplemental fuel line can be about 100% of the total amount of fuel provided to the IC engine 8. Fuel 10 entering the IC engine 8 through the supplemental fuel line 38 can be at a temperature from about 0° C. to about 40° C. and about 1.1 bar to about 5.0 bar. In some embodiments, the fuel 10 can enter the IC engine 8 through the supplemental fuel 38 line at about 15° C. and about 3.5 bar. The IC engine 8 can take in the fuel 10 through the supplemental fuel line 38 at about 2 g/s to about 200 g/s. In some embodiments, the fuel 10 can enter the IC engine 8 at about 2.60 g/s. Air 42 can also enter the IC engine 8 through an engine air line 46. The air 42 can enter the IC engine 8 at about 0° C. to about 50° C. and about 50 g/s to about 5000 g/s.

In addition to powering the compressor(s) 14, 16, the IC engine 8 can use the energy produced by combusting fuel 10 and exhaust fuel 58 from the anode side of the SOFC 4 to power a generator 12. The generator 12 can produce about 8 kW to about 2 MW of energy using excess mechanical shaft power. In some embodiments, the fuel compressor 14 can consume about 800 W. This energy can be sent to an inverter, like inverter 34 illustrated from the SOFC 4, to convert the energy to AC power, which is then sent to the power grid. In some embodiments, the energy can be stored in one or more storage system.

Turning now to the cathode side of the HPS 1, an oxidizing gas 62 enters the HPS 1 at about 0° C. to about 40° C., about 75 g/s to about 12,000 g/s, and about 2.1 stoichs to about 5.0 stoichs. The oxidizing gas can be air, exhaust air, oxygen rich air, oxygen gas, and combinations thereof. In some embodiments, the oxidizing gas 62 can enter the HPS 1 at about 20° C., about 90 g/s, and about 2.4 stoichs. At these temperatures, pressures, and flowrates, the oxidizing gas 62 moves toward the compressor 16.

According to various embodiments of the present invention, the compressor 16 will consume energy during operation. The compressor 16 can require about 7.5 kW to about 1900 kW. In some embodiments, the compressor 16 can require about 15.2 kW. This energy input can be provided directly by the IC engine 8 and/or the expander 20. The oxidizing gas 62 enters the compressor 16 at the temperatures, pressures, and flowrates above, and exits the compressor 16 at about 120° C. to about 200° C., about 75 g/s to about 12000 g/s, and about 2.3 bar to about 5.0 bar. In some embodiments, the oxidizing gas 62 can exit the compressor 16 at about 193° C., about 86 g/s, and about 3.75 bar. The oxidizing gas 62 can exit the compressor 16 and flows toward a heat exchanger 30, which can be a preheater. The oxidizing gas 62 can then exit the heat exchanger 30 at about 475° C. to about 630° C., about 75 g/s to about 12,000 g/s, and about 2.3 bar to about 5.0 bar. In some embodiments, oxidizing gas 62 can exit the heat exchanger 30 at about 490° C., about 86 g/s, and about 3.75 bar.

The oxidizing gas 62 can then enter the cathode side of the SOFC 4, and the oxygen in the oxidizing gas can be reduced into oxygen ions. The electrochemical reaction at the SOFC 4 can produce between about 80 kW and about 12,000 kW. In some embodiments, the reaction at the SOFC 4 can release about 120 kW of energy. The energy can be provided to the inverter 34. The inverter 34 can convert the energy released from the SOFC 4 from DC current to AC current, which is sent to a power grid.

The cathode exit stream can travel from the SOFC 4 back to the heat exchanger 30. The heat exchanger 30 can exchange heat from the cathode exit stream 63 exiting the SOFC 4 and the incoming stream. The temperature of the cathode exit stream 63 can be between about 620° C. and about 850° C. The oxidizing gas 62 can enter the heat exchanger 30 at about 620° C. to about 850° C., about 60 g/s to about 11,000 g/s, and about 2.3 bar to about 5.0 bar. In some embodiments, oxidizing gas 62 can enter the heat exchanger 30 at about 640° C., about 75 g/s, and about 3.7 bar. The oxidizing gas 62 can exit the heat exchanger 30 at about 225° C. to about 550° C., about 60 g/s to about 11,000 g/s, and about 2.2 bar to about 4.9 bar. In some embodiments, oxidizing gas 62 can exit the heat exchanger 30 at about 310° C., about 75 g/s, and about 3.6 bar. The cathode exit gas 63 can then move towards the expander 20.

The cathode exit stream 63 can pass through the heat exchanger 30 before entering an expander 20, at about 225° C. to about 550° C., about 60 g/s to about 11,000 g/s, and about 2.2 bar to about 4.9 bar. In some embodiments, cathode exit stream 63 exiting the heat exchanger 30 can be at about 310° C., about 75 g/s, and about 3.6 bar. In some embodiments, a mixing element can be used. The mixing element can include at least one combination of mixing valve or tank. The modifier element can be connected to the exit line. When a mixing valve is utilized as the mixing element, the cathode exit stream can exiting the expander 20 outlet at about 110° C. to about 400° C., about 60 g/s to about 11,000 g/s, and about 1.2 bar to about 3.0 bar. In some embodiments, the ejector/expander exit stream can be at about 170° C., about 75 g/s, and about 1.4 bar. Furthermore, in some embodiments a IC engine exhaust stream can be combined with the heat exchanger exit 30 to increase expander inlet temperature or with the expander exit stream or with the cathode exit stream, which can alter the temperature and pressure of the exhaust stream exiting in the exhaust gas line 70. In some embodiments, the cathode exit stream 63 can be provided to a valve 66, which can be directed to the atmosphere via an exhaust gas line 70 or a scrubber.

An aspect of the invention is a method to use the HPS to generate power. The method includes providing a combustible gas to an SOFC, wherein the SOFC comprises a cathode, solid state electrolyte, and an anode, and generating power using the SOFC. The method uses recycled gas to preheat streams entering the SOFC to conserve the energy required to operate the SOFC, which can result in a more efficient system.

The combustible gas can be natural gas, methane, ethane, propane, butane, gas mixtures containing at least one hydrocarbon such as methane, ethane, propane, or butane, natural gas mixtures containing these hydrocarbons, and the like a syngas (wherein the syngas comprises between about 5-100 vol. % of hydrogen, about 5-100 vol. % of carbon monoxide) biogas or combinations thereof. The combustible gas can be provided to at least one fuel compressor which can alter the temperature or pressure of the gas. The gas can be provided to the fuel compressor at a temperature between about 0° C. and about 50° C., and a pressure of between about 0 psig and about 15 psig. In some embodiments, the gas can enter the fuel compressor at about 15° C. The rate of the gas provided to the fuel compressor can vary between about 2 g/s to about 400 g/s depending on the overall power and efficiency of the HPS. In some embodiments, the gas can enter the fuel compressor at about 2.60 g/s. In some embodiments, the temperature of the combustible gas exiting the fuel compressor can be between about 40° C. and about 150° C., the pressure can be between about 40 psig and about 75 psig. The feed rate of the combustible gas can be between about 2 kg/s to between about 400 kg/s. The compressed combustible gas can be provided to a contamination removal system, which can be a desulfurizer for example. The gas can be provided to an ejector, where it can be combined with an anode recycle stream.

Next, the fuel stream can enter a heat exchanger where it is heated with an anode recycle stream prior to entering the SOFC. The fuel gas can enter the heat exchanger at about 230° C. to about 300° C. In some embodiments, the fuel gas can enter the heat exchanger at about 235° C. The gas stream exiting the fuel preheater or heat exchanger can be at a temperature of between about 500° C. and about 750° C.

The heated gas stream enters the SOFC at the anode at a temperature of about 500° C. to about 750° C., and a pressure of between about 25 psi and about 75 psi. Following the reaction at the anode, the anode exit stream is at a temperature of between about 600° C. and about 850° C., and can be used to heat the gas stream entering the preheater or heat exchanger. After exiting the preheater or heat exchanger, the temperature of the anode recycled stream can be between about 250° C. and about 600° C. to produce a cooled anode recycled stream. The cooled anode recycled stream can be provided to a blower, can be combined with the feed gas stream, for example in an ejector, or can be provided to an IC engine. The capacity of the IC engine can be between about 1 L and about 20 L. The combustible gas can also be provided directly to the IC engine, and can be used to regulate the temperature of the IC engine to between about 40° C. and about 325° C. The feed rate of the combustible gas can be between about 10 g/s and about 1500 g/s. The IC engine can operate at speeds which vary between about 1800 RPM and about 3600 RPM and can be configured as a naturally aspirated engine, with supercharging, or with turbocharging. If a boost engine is used, then the engine supply pressures can range between about 1.5 bar and about 3.0 bar. An oxidizing gas, which can be air, engine air or combinations thereof, is also provided to the IC engine and can be at a temperature of between about 0° C. and about 50° C., and a pressure between about 0 psi and about 30 psi. The feed rate of the oxidizing gas to the IC engine can be between about 50 g/s and about 5000 g/s. The IC engine can provide power to a generator. The generator can produce about 9 kW to about 1 MW of energy using excess mechanical shaft power. This energy can be sent to an inverter to convert the energy to AC power, which can then be sent to the power grid. In some embodiments, the energy can be stored in one or more storage system.

Gas exiting the IC engine can be at a temperature between about 250° C. and about 600° C., and a pressure between about 1.5 bar and about 3.0 bar. This gas can be further processed to remove contaminants, for example sulfur, before being released to the atmosphere.

In some embodiments, gas can enter the IC engine through the supplemental fuel line and can be at a temperature from about 0° C. to about 40° C. and about 1.1 bar to about 5.0 bar. In some embodiments, gas can be supplied to the IC engine during startup of the system or used during operation to supplement the IC engine. The IC engine can take in the fuel through the supplemental fuel line at about 2 g/s to about 200 g/s.

On the cathode side of the system, an oxidizing gas can be provided to a compressor to increase the pressure and temperature of the oxidizing gas feed stream to between about −20° C. and about 40° C., a flow rate of between about 75 g/s and about 12,000 g/s, and about 2.1 stoichs to about 5.0 stoichs, and a pressure of between about 12 psia and about 15 psia. The oxidizing gas feed stream can include exhaust air, air, oxygen rich air (i.e. greater than 21 vol. % oxygen), oxygen depleted air stream (i.e. less than about 21 vol. % oxygen), or combinations thereof. After exiting the compressor, the oxidizing gas, which is at temperature of between about 120° C. and about 200° C. can be provided to a heat exchanger, which can increase the temperature of the oxidizing gas feed stream to between about 450° C. and about 650° C., a flow rate of between about 75 g/s and about 12,000 g/s, and a pressure of between about 2.0 bar and about 5.0 bar prior to entering the SOFC. In the SOFC, the temperature of the oxidizing gas increases to between about 620° C. and about 780° C. The SOFC can operate at a temperature between about 500° C. and about 850° C., and a pressure of between 25 psia and about 75 psia. The stack power density of the SOFC can be increased by between about 10% and about 50% due to SOFC pressurization and design voltage and current density changes, in some embodiments 40% compared to traditional SOFC systems. Gas exiting the SOFC at the cathode can be used to increase the temperature of the oxidizing gas feed stream in the heat exchanger. The cathode gas stream can be oxygen depleted (i.e. less than about 21 vol. % oxygen), oxygen enriched (>21%), at ambient air concentrations, or combinations thereof. The cathode gas stream can be provided to an expander and can drive the compressor and pressurize the oxidizing gas feed stream supplied to the SOFC. In some embodiments, at least a portion of the cathode gas can be combined with the oxidizing gas feed stream. In some embodiments, at least a portion of the cathode gas can be treated to remove contaminants from the cathode gas, for example scrubbing the cathode gas to remove sulfur contaminants. In some embodiments, the cathode gas can be released to the atmosphere.

The cathode exit gas stream can travel from the SOFC back to the heat exchanger. The heat exchanger can exchange heat from the cathode exit stream exiting the SOFC and the incoming stream. The temperature of the cathode exit stream can be between about 600° C. and about 850° C. The oxidizing gas can enter the heat exchanger at about 600° C. to about 850° C., about 60 g/s to about 11,000 g/s, and about 2.3 bar to about 5.0 bar. The oxidizing gas can exit the heat exchanger 30 at about 225° C. to about 550° C., about 60 g/s to about 11,000 g/s, and about 2.2 bar to about 4.9 bar. In some embodiments, oxidizing gas can exit the heat exchanger at about 310° C., about 75 g/s, and about 3.6 bar. The cathode exit gas can then move towards the expander.

An advantage of the present invention includes the method of starting the system. The IC engine driveshaft can serve as a balance of plant, where the SOFC is the main power device and the rest of the equipment is considered the balance of plant. The configuration of the present invention allows for high efficiency and ease of startup. For example, during start up, the engine can be run and the exhaust can be passed through the SOFC to increase the temperature to the operating temperature. Once the SOFC is at the operating temperature, the supplemental fuel can be then be reduced or removed such that the fuel is now directed to the SOFC rather than to the IC engine. Once the SOFC can supply fuel to the IC engine via the anode exiting gas, then a steady state operating condition of the IC engine that will be highly efficient. Thus, the system allows for ease of startup.

According to some embodiments of the present invention, there is one process gas heat exchanger. This process gas heat exchanger is used to preheat fuel for a fuel stream on the anode side of the hybrid power system. A second preheater can also be used on the cathode side of the hybrid power system. The second preheater can then be an air reactant gas heat exchanger.

Ranges have been discussed and used within the forgoing description. One skilled in the art would understand that any sub-range within the stated range would be suitable, as would any number within the broad range, without deviating from the invention.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

The invention claimed is:

1. A hybrid power generator system, comprising:
a solid oxide fuel cell having an anode, an electrolyte layer, an interconnect layer, and a cathode;
a fuel line connected to an anode pathway of said fuel cell, wherein said fuel line carries a fuel to said anode pathway, wherein said fuel in said anode pathway reacts at said anode and produces a modified fuel with a composition that is different than said fuel;
an oxidizer line connected to a cathode pathway of said fuel cell, wherein said oxidizer line carries a pressurized first oxidizer to said cathode pathway, and wherein said pressurized first oxidizer in said cathode pathway reacts at said cathode and produces a modified first oxidizer with a oxidation composition that is different than said pressurized first oxidizer, and said fuel cell generates electric power from said reactions at said anode and cathode;
an internal combustion engine located downstream from said fuel cell having an intake, wherein the internal combustion engine comprises a driveshaft, wherein the driveshaft powers at least one component of the system;

a compressor powered by said driveshaft of said internal combustion engine, wherein said compressor intakes a first oxidizer and exhausts said pressurized first oxidizer at a higher pressure;

an anode exit line, connecting said anode pathway of said fuel cell to said intake of said internal combustion engine and carrying said modified fuel from said fuel cell to said intake;

a cathode exit line, connected to said cathode pathway of said fuel cell; and an oxidizer heat exchanger, connected to said oxidizer line and said cathode exit line, wherein said cathode exit line carries said modified first oxidizer from said fuel cell to said oxidizer heat exchanger.

2. The hybrid power generator system of claim 1, further comprising:

a fuel heat exchanger connected to at least one of said fuel line and said anode exit line, wherein said modified fuel in said anode exit line transfers heat to said fuel in said fuel line within said fuel heat exchanger, and said fuel enters said fuel heat exchanger at a first temperature and exits said fuel heat exchanger at a second temperature, wherein the second temperature is greater than the first temperature.

3. The hybrid power generator system of claim 1, wherein said modified first oxidizer in said cathode exit line transfers heat to said pressurized first oxidizer in said oxidizer line within said oxidizer heat exchanger, and said pressurized first oxidizer enters said oxidizer heat exchanger at a first temperature and exits said oxidizer heat exchanger at a second temperature, wherein the second temperature is greater than the first temperature.

4. The hybrid power generator system of claim 1, further comprising:

a modifier element connected to said anode exit line, wherein said modified fuel enters said modifier element at a first pressure and exits said modifier element at a lower second pressure to generate a pressure differential, wherein said modifier element produces mechanical energy from said pressure differential, and said compressor is at least partially powered by said modifier element.

5. The hybrid power generator system of claim 4, wherein the modifier element is at least one of a combination of a recycle blower, a mixing valve, and an ejector.

6. The hybrid power generator system of claim 4, further comprising a recycle line connected to said anode exit line and to said modifying element, wherein said fuel moving through said modifying element entrains said modified fuel from said anode exit line to heat said fuel.

7. The hybrid power generator system of claim 6, further comprising:

a desulfurizer connected to said fuel line at a location upstream of said modifying element, wherein said fuel enters said desulfurizer with a first sulfur content and exits said desulfurizer at a second sulfur content, and wherein the second sulfur content is less than the first sulfur content.

8. The hybrid power generator system of claim 7, further comprising:

a fuel compressor connected to said fuel line at a location upstream of said desulfurizer, wherein said fuel enters said fuel compressor at a first pressure and exits said fuel compressor at a higher second pressure.

9. The hybrid power generator system of claim 1, wherein said fuel is at least one of a methane, an ethane, a propane, or a butane, and said first oxidizer is air, exhaust air, oxygen rich air, oxygen, or combinations thereof.

10. The hybrid power generator system of claim 1, further comprising:

an electric circuit connected to said anode and to said cathode, wherein said reactions cause ion migration through said electrolyte layer and cause electricity to flow through said electric circuit to generate said electric power.

11. The hybrid power generator system of claim 10, further comprising an inverter connected to said electric circuit to convert said electric power from direct current to alternating current.

12. The hybrid power generator system of claim 1, further comprising:

a generator connected to the driveshaft of said internal combustion engine, wherein said generator converts at least some of said mechanical power produced by said driveshaft into electric power.

13. A method of generating power, comprising:

providing at least one fuel cell having an electrolyte layer and an interconnect layer positioned between an anode and a cathode;

reacting a fuel at said anode to produce a modified fuel with a composition that is different than said fuel;

reacting a pressurized first oxidizer at said cathode to produce a modified first oxidizer with a composition that is different than said pressurized first oxidizer;

generating electric power, by said fuel cell, based on said reactions at said anode and said cathode and based on a resulting ion migration through said electrolyte layer;

providing an internal combustion engine having an intake downstream from the fuel cell;

conveying said modified fuel from said anode to said internal combustion engine;

generating mechanical power, by said internal combustion engine, by combusting said modified fuel and a second oxidizer;

pressurizing, by a compressor, a first oxidizer to said pressurized first oxidizer, wherein said compressor is powered by said internal combustion engine;

conveying said modified first oxidizer from said cathode to an oxidizer heat exchanger; and heating, at said oxidizer heat exchanger, said pressurized first oxidizer at a location upstream of said fuel cell using said modified first oxidizer.

14. The method of claim 13, further comprising:

heating, at a fuel heat exchanger, said fuel at a location upstream of said fuel cell using said modified fuel, wherein said fuel enters said fuel heat exchanger at a first temperature and exits said fuel heat exchanger at a higher second temperature.

15. The method of claim 14, wherein said first temperature is between approximately 220° C. and 250° C., and said second temperature is between approximately 510° C. and 740° C.

16. The method of claim 13, wherein said pressurized first oxidizer enters said oxidizer heat exchanger at a first temperature and exits said oxidizer heat exchanger at a higher second temperature.

17. The method of claim 16, wherein said first temperature is between approximately 180° C. and 220° C., and said second temperature is between approximately 615° C. and 645° C.

18. The method of claim 13, wherein an operating temperature of said fuel cell is between approximately 600° C. and 850° C.

19. The method of claim 13, wherein an operating pressure of said fuel cell is between approximately 3 bar to 5 bar.

20. A hybrid power generator system, comprising:
- a fuel cell having an anode, an electrolyte layer, an interconnect layer, and a cathode;
- a fuel line connected to said anode of said fuel cell, wherein said fuel line carries a fuel to said anode, wherein said fuel reacts at said anode and produces a modified fuel with a composition that is different than said fuel;
- an oxidizer line connected to said cathode of said fuel cell, wherein said oxidizer line carries a pressurized first oxidizer to said cathode, wherein said pressurized first oxidizer at said cathode reacts and produces a modified first oxidizer with a composition that is different than said pressurized first oxidizer, and said fuel cell generates electric power from said reactions at said anode and cathode and from a resulting ion migration through said electrolyte layer;
- an internal combustion engine having an intake;
- an anode exit line connecting said anode of said fuel cell to said intake of said internal combustion engine, wherein said anode exit line carries said modified fuel from said fuel cell to said intake, and said internal combustion engine combusts a combination of said modified fuel and a second oxidizer to generate mechanical power;
- a compressor powered by said internal combustion engine, wherein said compressor intakes a first oxidizer and exhausts said pressurized first oxidizer at a higher pressure;
- a fuel heat exchanger connected to said fuel line and to said anode exit line, wherein said modified fuel in said anode exit line transfers heat to said fuel in said fuel line within said fuel heat exchanger, and said fuel enters said fuel heat exchanger at a first temperature and exits said fuel heat exchanger at a higher second temperature;
- a cathode exit line connected to said cathode of said fuel cell;
- an oxidizer heat exchanger connected to said oxidizer line and to said cathode exit line, wherein said cathode exit line carries said modified first oxidizer from said fuel cell to said oxidizer heat exchanger, wherein said modified first oxidizer in said cathode exit line transfers heat to said pressurized first oxidizer in said oxidizer line within said oxidizer heat exchanger, and said pressurized first oxidizer enters said oxidizer heat exchanger at a first temperature and exits said oxidizer heat exchanger at a higher second temperature; and
- a combining element comprising a blower and a mixing valve or an expander, connected to said cathode exit line, wherein said modified first oxidizer enters said combining element at a first pressure and exits said combining element at a lower second pressure to generate a pressure differential, and wherein said combining element produces mechanical energy from said pressure differential of said modified first oxidizer, wherein said compressor is at least partially powered by said combining element.

* * * * *